Nov. 22, 1960   S. R. FRANKEL ET AL   2,961,591
AUTOMATIC NEEDLE POSITIONING MECHANISM
Filed June 16, 1958   6 Sheets-Sheet 1

INVENTORS
SAMUEL R. FRANKEL
HARRY C. HUNT
KENNETH C. HAAS
CARL M. WENRICH
BY /s/ Edelson
ATTORNEY Nov. 22, 1960   S. R. FRANKEL ET AL   2,961,591
AUTOMATIC NEEDLE POSITIONING MECHANISM
Filed June 16, 1958   6 Sheets-Sheet 2

INVENTORS
SAMUEL R. FRANKEL
HARRY C. HUNT
KENNETH C. HAAS
CARL M. WIENRICH
BY
ATTORNEY.

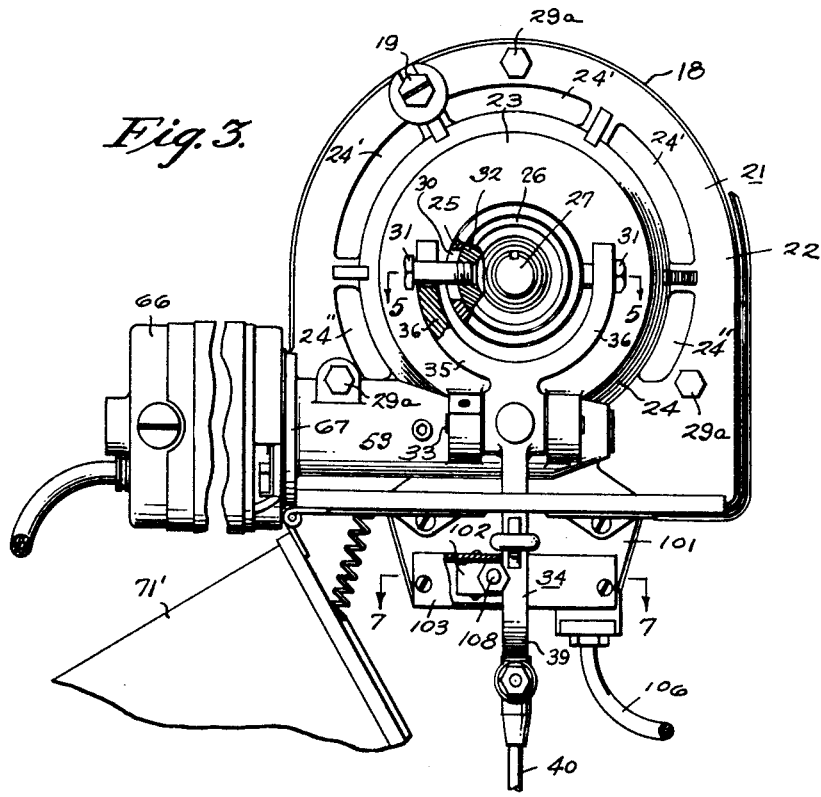

Nov. 22, 1960  S. R. FRANKEL ET AL  2,961,591
AUTOMATIC NEEDLE POSITIONING MECHANISM
Filed June 16, 1958  6 Sheets-Sheet 4

INVENTORS
SAMUEL R. FRANKEL
HARRY C. HUNT
KENNETH C. HAAS
CARL M. WENRICH
BY
ATTORNEY.

Nov. 22, 1960   S. R. FRANKEL ET AL   2,961,591
AUTOMATIC NEEDLE POSITIONING MECHANISM
Filed June 16, 1958   6 Sheets-Sheet 5

INVENTOR.
SAMUEL R. FRANKEL
HARRY C. HUNT
KENNETH C. HAAS
CARL M. WENRICH
BY
Lew Edelson
ATTORNEY Nov. 22, 1960 S. R. FRANKEL ET AL 2,961,591
AUTOMATIC NEEDLE POSITIONING MECHANISM
Filed June 16, 1958 6 Sheets-Sheet 6

INVENTORS
SAMUEL R. FRANKEL
HARRY C. HUNT
KENNETH C. HAAS
CARL M. WENRICH
BY
ATTORNEY

United States Patent Office 2,961,591
Patented Nov. 22, 1960

2,961,591

AUTOMATIC NEEDLE POSITIONING MECHANISM

Samuel R. Frankel, Shillington, Harry C. Hunt, Reading, Kenneth C. Haas, Mohnton, and Carl M. Wenrich, Reading, Pa., assignors to American Safety Table Company, Inc., Reading, Pa., a corporation of Pennsylvania Filed June 16, 1958, Ser. No. 742,251

7 Claims. (Cl. 318—468)

This invention relates generally to intermittently operated utilities and particularly to a power transmission organization operative to terminate operation of the untility when the moving parts thereof are in a predetermined position, the instant application being a continuation in part of the prior co-pending application for United States Letters Patent, Serial No. 526,756, filed August 5, 1955.

Our invention may be applied to a wide variety of devices in many different fields, however, one field of application is that of the garment industry wherein power sewing machines are widely used. Generally, in such application, it is required that the sewing machine be intermittently operated with the periods of non-operation affording an opportunity to shift the position of the item being stitched. In such case, it is most desirable that the needle be in its down position so that the work may be readily turned about it. Sometimes, of course, it is more desirable that the needle be in the up position so that the work may be readily removed from the sewing machine.

Heretofore the method of placing the needle in the desired position when the machine is stopped has been to rotate the balance wheel of the sewing machine by hand. Hand operation of the balance wheel to achieve desired needle positioning is very time consuming and can represent an appreciable fraction of the labor cost involved in producing a garment. It is therefore a great benefit to the garment industry, and ultimately to the consumer, that labor costs be reduced in the production of stitched articles by eliminating the time wastage associated with the manual positioning of the sewing machine needle.

A principal object of our invention is to provide a power transmission for driving a utility such as a sewing machine during its normal operation, and an auxiliary control circuit which is inoperative during normal operation but which is automatically operative thereafter to move the working parts of the utility to one of several predetermined positions.

Another object of our invention is to provide such a power transmission wherein the control circuit exhibits a rapid positive action and affords accurate positioning control of the power transmission.

A further object of our invention is to provide a power transmission and control circuit for a sewing machine which automatically places the needle in a predetermined desired position upon termination of a stitching operation, and which allows the needle to be stepped from one to another of certain predetermined needle positions under the control of the machine operator.

It should be understood that although our invention is described for purposes of illustration in connection with a power sewing machine, the principles involved are generally applicable to a wide variety of devices, and those other applications will be apparent to persons normally skilled in the art. Accordingly, these and other objects and advantages of our invention will appear more fully hereinafter from an examination of the detailed description and appended drawings, wherein:

Figure 3 is a right-hand elevational view of the power transmission shown in the view of Figure 2.

Figure 5 is a sectional view taken along the line 5—5 of Figure 3.

Figure 6 is a sectional view taken along the line 6—6 of Figure 2.

Figure 7 is a sectional view taken along the line 7—7 of Figure 3.

Figure 10:
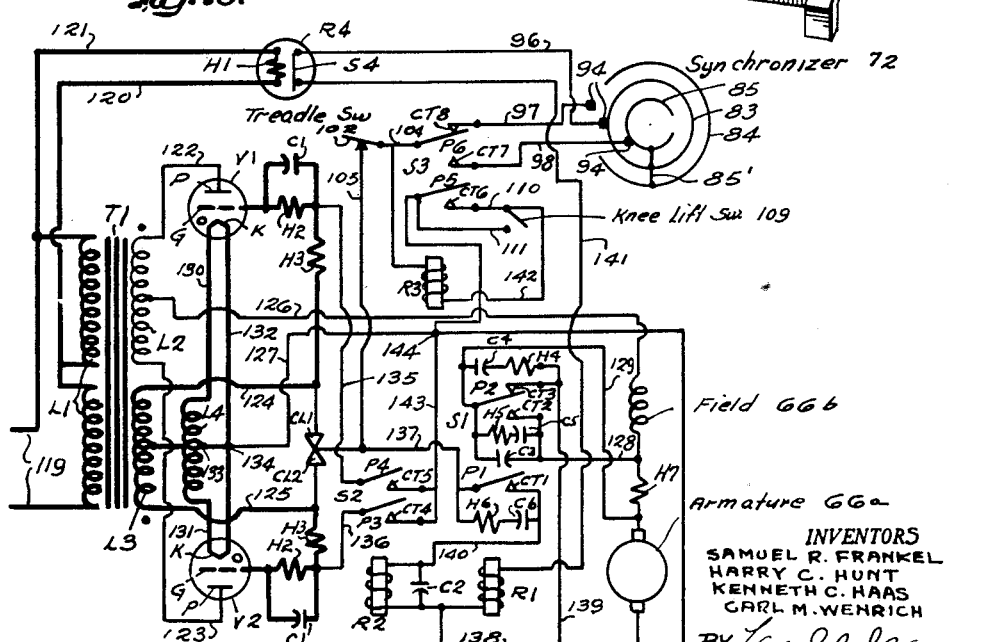
Figure 10 is a schematic wiring diagram illustrating a typical control circuit for establishing predetermined needle positions of a sewing machine or other mechanical device.

Figures 11 through 16 inclusive are schematic diagrams similar to that of Figure 10 but which illustrate the control circuit in various phases of its operation.

In the several figures like elements are denoted by like reference numerals.

Figure 1:
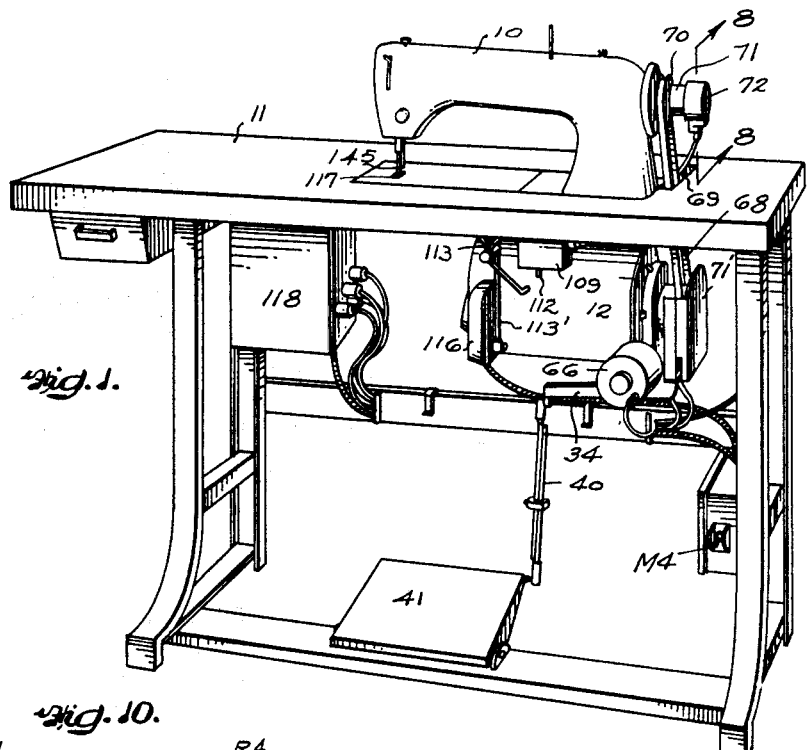
Figure 1 is a perspective view of a sewing machine of the manufacturing type constructed in accordance with and embodying the general principles of the present invention.

Before describing in detail the various components of the overall sewing machine organization, it will be conducive to a more complete understanding if the general functions and organizational interrelations be first explained. Figure 1 shows a sewing machine 10 which may be driven by a belt 68 from a power transmission unit 12 mounted beneath the table 11. The power transmission 12 includes a constantly rotating motor which drives the spindle of the sewing machine 10 through the medium of a clutch mechanism. The clutch mechanism, is engaged by foot depression of the treadle 41 which causes the linkage 40 and 32 to shift that part of the clutch which carries the belt 68 into engagement with the rotating motor. Upon release of the treadle 41, the belt carrying portion of the clutch mechanism is disengaged from the motor and engages a brake which stops the belt 68 and hence the spindle of the sewing machine.

In order to accomplish positioning of the sewing machine needle 145 at a predetermined point when the clutch is disengaged by release of the treadle 41, several other components are required. These components basically consist of a needle position sensing device, an auxiliary drive for the belt 68, and a control circuit for the auxiliary drive. The sensing device utilized is the element 72 affixed to the sewing machine spindle by an adapter 71 and is hereinafter called a synchronizer. The synchronizer senses the needle position when the sewing machine is in the process of being stopped and operates on the control circuit which in turn operates on the auxiliary drive to insure that the sewing machine needle 145 stops in the desired position. The control circuit is show in Figure 1 as included within the housing 118 affixed to the left underside of the table 11. The auxiliary drive includes the auxiliary motor 66 which is coupled to the clutch mechanism through the brake mechanism, and so is effectively coupled to the belt 68. The synchronizer 72, control circuit (in housing 118), and auxiliary motor 66 are electrically connected through a cabling arrangement.

A pair of switches form an integral part of the control circuit but these switches are not located within the housing 118. One of the switches is operated by the treadle 41 and is hereinafter called the treadle switch, while the other switch is operated by a knee pad 116 and is hereinafter called the knee-lift switch 109. The treadle switch determines the time at which the synchronizer will be allowed to control the sewing machine needle position, while the knee-lift switch changes the control circuit conditions so that a particular one of several predetermined needle stop positions may be selected.

Understanding now the overall organization of the sewing machine apparatus, the separate components will be individually described in detail and the specific operations will be made clear. The components will be described in the following order:

(1) The power transmission 12 and its organization with the spindle drive belt 68, and the mechanical aspects of the auxiliary motor 66 coupled to the brake apparatus. For this aspect, reference will be made to Figures 1 through 6.

Figure 8:
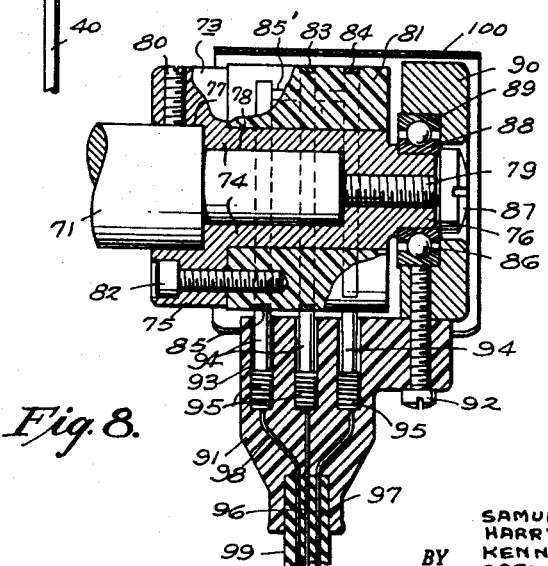
Figure 8 is an enlarged sectional view taken along the line 8—8 of Figure 1.

(2) The mechanical aspects of the synchronizer 72 and its relationship to the sewing machine spindle and belt 68. Reference will be made to Figure 8.

Figure 2:
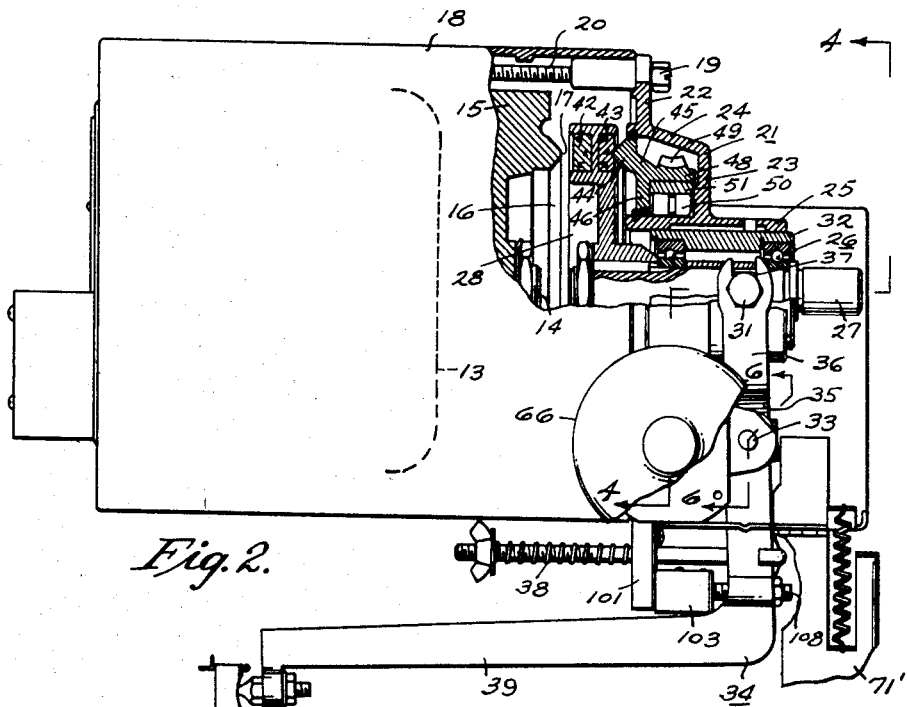
Figure 2 is an enlarged front elevation of the power transmission mechanism with parts broken away, sectioned, or omitted for the sake of clarity.

(3) The mechanical aspects of the treadle switch and its organization with the treadle 41 and linkage 34 and 40. Reference to Figures 2, 3, and 7 will be made for various aspects of the switch.

Figure 9:
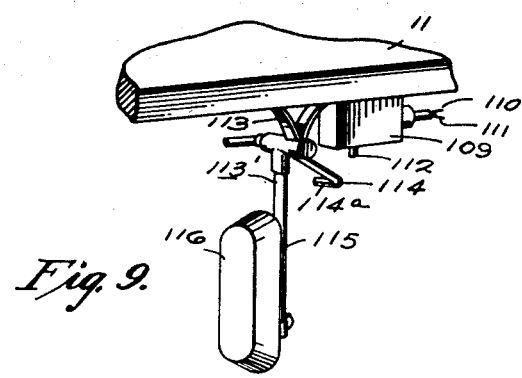
Figure 9 is a perspective view of a knee-operated switch for controlling the needle positioning mechanism associated with the sewing machine.

(4) Figures 1 and 9 will be referred to for details of the knee-lift switch.

(5) Figures 10 through 16 will be referred to for details of the control circuit within the housing 118 and the overall operation of the sewing machine as related to the control circuit, synchronizer, power transmission, treadle switch, and knee-lift switch.

Refer now to Figures 2 through 6 for an understanding of the power transmission details. As best seen in Figure 2 the power transmitting organization 12 comprises a principal electric motor 13 that has a shaft 14 which is extended to receive thereon a flywheel 15, the latter being suitably keyed to the motor shaft for rotation therewith. Formed on the face of the flywheel 15 which is remote from the motor 13 is an annular rib 16 of generally triangular shape in transverse cross-section to provide it with a relatively sharp outer edge 17.

The motor 13 and its associated flywheel 15 are carried as an assembly by a supporting housing 18, within which housing the assembly is axially adjustably fixed by means not shown, except for a nut 19 threaded on a rod 20. It will be understood that when the assembly is secured within the housing in its axially adjusted position, the flywheel 15 is centered within the housing and is free to rotate therewithin.

Refer now to Figure 3. Secured to the rear of the housing 18, as by bolts 29a, is an end member 21 having a radially extending outer wall part 22 which is jointed to an annular rearwardly offset inner wall part 23 by an annular axially extending intermediate wall part 24. The outer wall part 22 is provided with arcuate openings 24'—24' disposed adjacent to the intermediate wall part 24. Extending centrally through the inner wall part 23 of the end member 21 as an integral part thereof is a cylindrical journal box 25, and fitted within the latter is a ball-bearing assembly 26 which rotatably receives a shaft 27. Mounted respectively on opposite ends of the shaft 27 are a clutch disc 28 (see Figure 2) and a belt pulley 29, for which latter see Figure 5. The journal box or housing 25 for the ball-bearing assembly 26 is provided at diametrically opposite sides thereof with openings 30 through which respectively project a pair of studs 31—31 suitably secured to diametrically opposite sides of the external sleeve of the ball-bearing assembly 26, designated 32. It will be understood, of course, that the clutch disc 28 and the belt pulley 29 are each non-rotatably secured to the shaft for rotation therewith and that the clutch disc 28 and belt pulley 29, shaft 27 and ball-bearing assembly 26 are axially shiftable as a unit within the relatively stationary journal box 25 by the means presently to be described. Pivotally secured to the end member 21, as at 33, is a clutch-actuating lever 34, this lever being provided at its upper end with a yoke portion 35 that has laterally spaced arms 36—36 which embrace the journal box 25. The arms 36—36 are each provided with a slotted terminal end 37 (see Figure 2) for engagement with the stud 31 previously described that projects outwardly through an opening 30 in the side wall of the journal box 25.

Refer back now to Figure 2. The lever 34 is under the influence of a spring 38 which normally holds the lever in its position as shown in Figure 2, in which position the clutch disc 28 is disengaged from the flywheel 15 of the motor 13. The lower arm of the pivoted lever designated 39, is suitably connected, as by a link 40, to a foot treadle 41 (as seen in Figure 1) for actuation of the lever, it being noted that a downward pull upon the link 40 shifts the yoke portion 35 of the lever toward the motor 13 and so causes the portion 42 of the clutch disc to engage the annular rib 16 of the motor flywheel 15. The clutch disc 28 is provided adjacent its peripheral edge with a pair of oppositely facing annular friction discs 42 and 43 of cork or other suitable resilient material, these discs being adapted for alternative engagement respectively with the annular rib 16 of the flywheel 15 and an annular rib 44 formed upon a revoluble member designated generally by the numeral 45, now to be described.

This member 45 comprises a centrally apertured web portion 46 fitted loosely over the inner end portion of the journal box 25, an inner rim portion that carries the annular rib 44 and an outer rim portion 48 that has formed thereon worm engaging teeth 49. Between the web 46 of the revoluble member 45 and the central wall part 23 of the end member 21 and surrounding the journal box 25 is a roller-bearing assembly 50. The external sleeve of this assembly, designated 51, is fitted within the outer rim portion 48 of the revoluble member 45 and carries the revoluble member 45 for rotation about the journal box 25. It will be understood that the annular rib 44 is similar to the annular rib 16 in that it presents axially, albeit in the opposite direction, and is of generally triangular shape in transverse cross-section to provide it with relatively sharp outer edge. The revoluble member 45 is a component part of a brake and auxiliary drive assembly, presently to be described.

Figure 4:
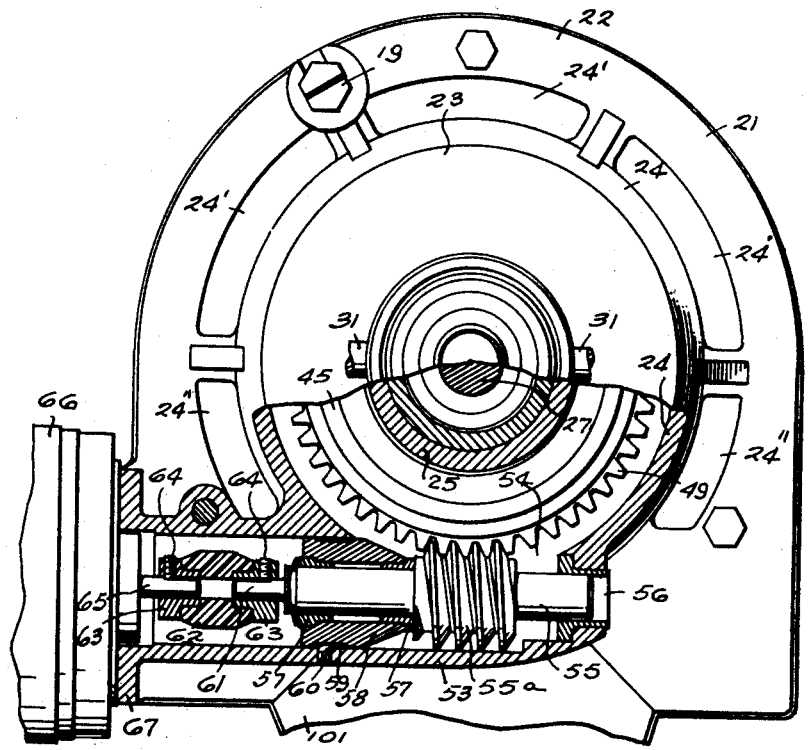
Figure 4 is a right-hand elevation view, partly in section, taken as indicated along the line 4—4 of Figure 2.

Refer now to Figure 4. Extending horizontally along the bottom portion of the end member 21 immediately beneath and in substantial tangential relation to the annular central part 24 thereof is a tubular part 53 formed as an integral extension of the end member 21. The interior of the tubular part 53 communicates with the annular space extending about the inner end portion of the journal box 25, the opening through which communication is effected being designated 54. Within the tubular part 53 is a worm shaft 55 having an intermediate worm portion 55a which underlies and meshes with the teeth 49 on the rim of the revoluble member 45. One end portion of the worm shaft 55 is journaled in a bushing 56 suitably carried by the end member 21, while the opposite portion of the shaft is journaled in a bushing assembly comprising a pair of axially spaced bushings 57—57 suitably fitted into the opposite ends of a supporting sleeve 58, the latter being externally circumferentially grooved, as at 59, for receiving the end of a set screw 60, which is threaded through the wall of the tubular part 53 and which serves to secure the bushing assembly and consequently the worm shaft 55 against any material axial displacement.

A reduced diameter end portion 61 of the worm shaft 55 carries one end of a flexible coupling designated generally by the numeral 62. The coupling 62 which is preferably formed of a suitable flexible material, for example, neoprene, is suitably fitted with a pair of metal end bushings 63—63, one of which bushings is received by the reduced diameter end portion 61, being secured thereto by a set screw 64. The other bushing 63 is received by and similarly set-screwed to a shaft 65 which is axially alined with the worm shaft 55. The shaft 65 is a component part of an auxiliary direct current series wound motor 66 that is suitably secured to the outer end of the tubular part 53 through the medium of an external flange 67 which is formed integral with the part 53.

As most clearly appears in Figures 1 and 5, trained over the belt pulley 29 is a drive belt 68, which extends upwardly through a suitable opening 69 in the table top 11, being then trained over a belt pulley 70 mounted on the sewing machine spindle. Associated with the belt pulley 29 and the drive belt 68 is a guard, designated 71'. Additionally, mounted on the spindle adapter 71 of the sewing machine or other work utility is a synchronizer 72, now to be described.

This synchronizer 72, as most clearly appears in Figure 8, comprises a metal core 73 in the form of a cylindrical main body 74 which terminates at opposite ends respectively in an external flange 75 and a reduced diameter portion 76. The flanged end of the core 73 is provided with a central bore portion 77 that communicates with a reduced diameter bore portion 78 which in turn communicates with an internally threaded bore portion 79 still further reduced in diameter and extended through the reduced diameter portion 76 of the core 73. The flanged end of the core 73 is fitted over the complementally shaped end of the sewing machine spindle adapter 71, being secured thereto by a set screw 80.

Embracing the main body 74 of the core 73 is a cylindrical sleeve 81 made of insulating material, this sleeve being secured against displacement by set screw 82 and being of such a length that the reduced diameter portion 76 of the core 73 extends axially beyond the sleeve. Embedded in axially spaced external portions of the sleeve 81 are three electrical conductor rings 83, 84, and 85, the ring 83 being in the form of a continuous ring and the rings 84 and 85 being in the form of split rings, these splits being disposed at diametrically opposed sides of the sleeve 81. The rings 83, 84, and 85 are suitably electrically interconnected, as by bus-bar means 85'.

The reduced diameter portion 76 of the core 73 is fitted with a ball-bearing unit 86 that is secured in position by a screw 87 threaded into the bore 79 so that the head thereof abuts the inner race 88 of the ball-bearing unit. It will be observed that the metal core 73, insulating sleeve 81, conductor rings 83, 84, and 85, bus bar 85' and race 88 of the ball-bearing unit rotate as a unit with the sewing machine spindle.

Pressed or otherwise non-rotatably fitted upon the outer race 89 of the ball-bearing unit 86 is an annular metallic member 90 against the underside of which is seated a brush supporting member 91 made of insulating material, the member 91 being secured by the screw 92 to the member 90 which in turn is press-fitted upon the outer race 89 of the ball-bearing unit. The main body of the brush mounting is provided with suitably spaced brush-receiving sockets 93 for respective alinement with the conductor rings 83, 84, and 85. Disposed within the sockets 93 are contact brushes 94 seated upon coil springs 95 and biased therby against the conductor rings. The coil springs are connected respectively to a set of conductor wires, designated 96, 97, and 98, that lead therefrom through a common covering 99 of suitable material. Suitably secured to the brush housing member 91 and extending around the sleeve 81, the rings 83, 84, and 85 and the bus bar 85' is a shield 100. It will be observed that the race 89 of the ball-bearing unit and the annular member 90, the brush housing member 91 and the shield 100 form a stationary, non-rotating unit.

As previously described, the pulley 70 is fixed to the spindle for driving the needle 145 via the belt 68, the pulley 29 and the shaft 27. It should be clear at this point that the shaft 27 may be driven either by the primary motor 13 via the clutch mechanism, or by the auxiliary motor 66 via the brake and worm gear mechanism. These mechanical aspects have already been described in connection with Figures 2, 3, and 4. The synchronizer controls the auxiliary motor 66 through the control circuits by virtue of the brush and slip-ring arrangement just described in connection with Figure 8.

The center ring 83 and its associated brush 94 and lead 96 are always in an electric circuit of the control circuits. A complete electric circuit is traced through the synchronizer along a path including lead 96, and its brush 94, the center ring 83, the bus-bar 85' and then either through split-ring 84, its brush 94 and lead 97, or through split-ring 85, its brush 94 and lead 98. The choice as to which of the split-ring paths is employed is determined by the knee-lift switch 109. When the synchronizer is effective to actuate the auxiliary motor 66 it will cause the latter to drive the spindle until the brush 94 registers with the gap in the selected split-ring circuit, at which time the motor 66 will stop because of the break in the synchronizer circuit continuity. It is therefore apparent that the needle 145 will stop at a predetermined position because it is indexed to the synchronizer split-rings via the spindle. The manner in which the knee-lift switch 109 operates to provide needle position selectivity will be clearly brought out in connection with the description of Figures 10 through 16. The mechanical aspects of the treadle switch and knee-lift switch will now be described.

Referring particularly to Figures 2, 3, and 7, secured to the back of a depending extension 101 of the end plate 21 is a treadle switch 102 that is mounted within a housing 103. This switch 102 is connected by a pair of conductor wires 104 and 105 suitably sheathed in a covering 106 and connected into the circuit as shown in Figure 10. The switch 102 is provided with a push button 107 that extends through a wall of the housing 103 and registers with an adjustable actuator element 108 which is threaded through a lateral extension of the lower arm 39 of the lever 34. In the illustrated condition of the machine, the push button 107 is only partially depressed and the switch 102 is closed. The push button 107 automatically moves from its partially depressed to its fully depressed position as the throw of the lever 34 increases due to wear in the clutch assembly. The actuating arrangement is such that the switch will open when the treadle 41 is depressed sufficiently to position the clutch disc 28 intermediate its clutching and braking positions.

As will be subsequently seen, the treadle switch makes and breaks the electrical circuit through the synchronizer slip-ring circuits and therefore directly controls the interval during which the synchronizer may exercise control over the spindle via the auxiliary motor 66 and the brake assembly. When the treadle 41 is not depressed, which corresponds to the condition wherein the brake is engaged and the clutch disengaged, the treadle switch 102 is closed so that the synchronizer may control the spindle. However, when the treadle 41 is depressed to engage the clutch for driving the spindle from the main motor 13, the switch 102 opens before the clutch engages, thereby disabling the synchronizer and the auxiliary motor. Conversely, when the treadle is released and the clutch disengaged, the switch 102 closes just before the brake is engaged so that the synchronizer is given immediate control of the spindle.

Referring particularly to Figures 1 and 9, secured to the underside of the table top 11 is a knee-lift switch assembly 109. This switch is connected into the circuit by a pair of conductor wires 110 and 111 and is provided with a downwardly presenting push button 112 for actuation of the switch. Likewise secured to the underside of the table top 11 is a bracket 113 that carries an actuating lever for the knee-lift switch, designated generally by the numeral 113′, mounted for pivotal movement. The lever 113′ is provided with a pair of angularly related arms 114 and 115, the former being provided with a terminal portion 114a that registers with the push button 112 and is normally disposed in lower spaced relation thereto, and the latter being fitted with a knee pad 116. In the illustrated at rest condition of the machine, the knee-lift switch is open. When, however, the lever 113′ is swung about its pivotal axis to a position wherein the terminal portion 114a of the arm 114 operatively depresses the push button 112, the switch 109 is closed. Immediately upon release of the lever 113′, it returns to its initial position by reason of its own weight and so re-opens the switch 109. It will be understood that while the terminal portion 114a of the arm 114 is swinging into contact with the push button 112, the presser foot of the stitch forming mechanism, designated 117, may be raised by means (not shown) associated with the lever 113′.

The raising of the presser foot 117 would be required, for example where the actuation of the knee-lift switch 109 causes the needle 145 to be stopped in its up position so that the work may be readily removed from the machine. For purposes of illustration hereinafter it will be assumed that actuation of the knee-lift switch 109 causes the needle 145 to be stopped in its up position, and that non-actuation of this switch causes the needle 145 to be stopped in its down position. The circuitry of Figures 10 through 16, now to be described, is so arranged that the foregoing assumed action is achieved.

Turn now to a consideration of Figure 10. Except for the synchronizer 72, the auxiliary motor 66, the treadle switch 102, and the knee-lift switch 109, all of the component parts illustrated in Figure 10 are contained within the housing 118 illustrated in Figure 1 affixed to the underside of the table 11. At the left-hand side of Figure 10 there will be seen a pair of conductors 119 which are connected to opposite ends of the seriesed primary windings L1 of a transformer T1. One side of the energization circuit 119 is connected to one terminal of a thermal time delay relay resistance element H1 by a line 121, the other side of the resistance element H1 being connected by a line 120 to the center tap of the primary windings L1 of the transformer T1. The thermal resistance element H1 is part of a thermal time delay relay R4 which also includes a switch S4. The lines 119 may be energized from a voltage source through a main power switch, which may be for example the switch M4 shown at the right-hand side of Figure 1. The purpose of the thermal time delay relay R4 is to prevent operation of the synchronizer circuits until such time as the electronic circuitry shown in Figure 10 has had a chance to stabilize. After a sufficient length of time for circuit stability to occur, the switch S4 of the relay R4 snaps closed due to the thermal action of the resistance element H1, and the circuit is thereafter in operating condition.

Transformer T1 contains three separate secondary windings, L2, L3, and L4. Secondary winding L2 supplies plate voltage to the anodes of a pair of grid controlled thyratrons V1 and V2 via the leads 122 and 123. The cathodes K of the thyratrons V1 and V2 are energized from winding L4 by leads 130, 131, and 132, the latter being connected to the center tap 133 of the winding L4. The thyratrons V1 and V2 are employed in this circuit as gated high-capacity rectifiers for converting the alternating current potential appearing at their plates P from the winding L2 into direct current which appears at the junction 134 which junction is between the cathode lead 132 and the high-voltage-circuit energizing lead 127.

The thyratrons V1 and V2 are grid controlled devices in that the initiation of conduction from anode to cathode may be grid controlled, although once conduction has been initiated current cut-off will be determined solely by the drop of anode potential to the conduction extinction point. The circuitry for controlling current conduction through the thyratrons by means of the thyratron grid control characteristic is associated with the secondary winding L3 of the transformer T1 and the relay R2, which will now briefly be discussed.

It will be observed that the bottom end of winding L3 is connected to the grid of the thyratron V2 through the resistance-capacitance network including resistors H3 and H2 and capacitor C1, and that the upper end of winding L3 is connected to the grid of the thyratron V1 through a similar resistance capacitance network. Ignore for the moment the crystal rectifiers CL1 and CL2 since they are not part of the thyratron grid control circuit, but serve an altogether different purpose which will be subsequently explained. It will be further observed that the poles P4 and P3 of the relay R2 are connected respectively to the junction between the resistors H2 and H3 in the grid circuit of thyratrons V1 and V2. The contacts CT4 and CT5 associated respectively with the poles P3 and P4 of the relay R2 are strapped together and returned to the center tap of the winding L3 via the leads 143 and 127.

Consider now the potential considerations at the anodes P and the grids G of the thyratrons V1 and V2. It is seen from observing the standard dot configuration on the windings L2 and L3 that when the anode of thyratron V1 goes positive, the grid of V1 goes negative, and at the same time the anode of thyratron V2 goes negative and its grid goes positive. The thyratron V1 is therefore prevented from conducting because of the negative grid bias presented to its grid, whereas the thyratron V2 is prevented from conducting even though its grid is positive because its anode is at a negative potential. During the next half cycle when the phase of the alternating voltage at the terminals of the windings L2 and L3 reverses, the thyratrons V1 and V2 will remain in their cut-off condition since the potential considerations at the anodes and grids of the thyratrons V1 and V2 has merely been interchanged.

Consider now the change in conditions when the relay R2 becomes energized in a manner to be subsequently explained. Energization of the relay R2 causes the poles P3 and P4 of the associated switch S2 to be pulled-in and to thereby close a circuit with their associated contacts CT4 and CT5. Upon such actuation of the relay R2 it is seen that the junction between the resistors H2 and H3 in the grid circuit of each of the thyratrons V1 and V2 is connected to the center tap of the winding L3 by conductors 135 and 136, through the relay contacts, along conductor 143 and the conductor 127. Since the center taps of the windings L3 and L4 are connected together, it is clear that the potential at the grids of the thyratrons V1 and V2 is clamped to the cathode potential, and hence the bias potential normally supplied to these grids from the winding L3 is reduced to zero. Under such conditions, each of the thyratrons V1 and V2 will fire when its anode P goes sufficiently positive relative to the potential on line 126 which is connected to the center tap of the winding L2. Thus, full-wave rectified current may flow from the positive end of the winding L2, through the associated thyratron to the cathode junction 134, and out over line 127. From line 127 the current will flow to the right, past junction 144 and down to the bottom end of the armature winding 66a, through the armature 66a and field winding 66b and over toward the left along conductor 126 to the center tap of the winding L2. Thus, it is clear that when the thyratrons V1 and V2 are rendered conducting as the result of the actuation of relay R2, the auxiliary motor 66 will be energized. The resistor H7, between the armature 66a and the field winding 66b is short-circuited during motor 66 operation by relay R1 as will be subsequently made clear.

When relay R2 is deenergized it is thus seen that a negative grid bias is presented to the grids of the thyratrons V1 and V2 from the winding L3 of transformer T1, and when relay R2 is energized the negative grid bias is suppressed and the grid potential is raised to the cathode potential. The negative grid bias is therefore seen to constitute a gating signal level which maintains the gated rectifiers V1 and V2 in a "gated off" or closed gate state, whereas the zero grid bias is seen to constitute a gating signal level which maintains the gated rectifiers V1 and V2 in a "gated on" or open gate state.

Consider now the relay energizing circuits which are supplied with energizing current from the winding L3 and the full wave rectifier circuit comprising the crystal rectifiers CL1 and CL2. The full wave rectifier circuit including the winding L3 and the rectifiers CL1 and CL2 provides direct current at the junction of the rectifier CL1 and CL2 cathodes for energizing all of the relays R1, R2, and R3, but although energizing current is always available from this rectifier circuit, other considerations actually determine the energization time of the relays. This can be seen by tracing the circuitry from the junction of the rectifiers CL1 and CL2 along conductor 105 to the treadle switch 102, which is shown in its closed position and thus corresponds to the condition wherein the treadle 41 has been released by the operator. From the treadle switch 102 the current will flow to the right along conductor 104 through pole P6 and contact CT8 of relay R3, along conductor 97 to brush 94. If the synchronizer 72 is in the position illustrated so that the brush 94 registers with the gap in the split-ring 84 then the current continuity is disrupted and no further action will occur. This of course corresponds to the condition wherein the needle has stopped in the desired position, for example in its down position. Assuming however that the synchronizer 72 were in a somewhat rotated position so that the brush 94 made contact with the split-ring 84, then the current continuity would be traced through the split-ring 84 to the bus-bar 85' and to the center ring 83. From the center ring 83 the current would flow through brush 94 over conductor 96, through the switch S4 of the relay R4, down through conductor 141, and the winding of relay R1 to line 138, and thence to the right and upward and to the left along the conductor 127 to the center tap of the winding L3. Thus relay R1 would be energized.

The energization of relay R1 permits relay R2 to be energized because current may now flow from the rectifiers CL1 and CL2 along conductor 137, through pole P1 and contact CT1 of the relay R1 and then along conductor 140 through the relay winding R2 to the conductor 138, and thence back to the center tap of winding L3. It is thus seen that the relay R2 cannot be energized unless the relay R1 has first been energized. By arranging the circuitry in this way it is clear that the auxiliary motor 66 may not be energized unless the treadle switch 102 is closed and the synchronizer 72 is in proper position, since energization of the auxiliary motor 66 requires the energization of the relay R2 and this latter relay may not be energized unless R1 has first been energized.

With the circuit conditions as shown in Figure 10 and as just described, it is clear that only the split-ring 84 of the synchronizer 72 can control the energization of the relays R1 and R2, and hence the energization of the auxiliary motor 66. This is so because of the contact arrangement of the relay R3. If it is desired that the split-ring 85 should control the energization of the relays R1 and R2, it is necessary that the pole P6 of relay R3 be transferred from its contact CT8 to its contact CT7 so that current may flow from the treadle switch 102 through the pole P6 and contact CT7 along conductor 98 to the split-ring 85. The break in the split-ring 85 being 180 degrees opposite to that of the split-ring 84 it is clear that when the split-ring 85 controls the relay energization it will cause the needle to stop in its up position.

The transfer of the pole P6 of relay R3 from its contact CT8 to its contact CT7 requires the energization of the relay R3 which under the conditions as shown can never be energized because of the open circuit between pole P5 and contact CT6 of this relay. When the conditions are as shown, relay R3 may be energized by closing of the knee-lift switch 109. Such closing of the knee-lift switch 109 allows current to be conducted from the treadle switch 102 down through the relay R3 winding, thence along conductor 142 and through the knee-lift switch 109 to conductor 111 and the pole P5 of the relay. The current then continues its flow from the pole P5 down to the junction 144 and along the conductor 127 to the center tap of the winding L3. Relay R3 being now energized, the poles P5 and P6 will transfer and engage respectively their contacts CT6 and CT7. When pole P5 closes on contact CT6 a current path for the winding of relay R3 is established as before except that the knee-lift switch 109 is now bypassed and it may therefore be released without breaking the circuit continuity. The pole P5 and contact CT6 therefore function as a holding circuit to provide holding current for the relay R3 and maintain the poles P5 and P6 in their transferred condition. The transfer of pole P6 to its contact CT7 establishes the split-ring 85 as the controlling element of the synchronizer in the manner previously described. The needle 145 of the sewing machine 10 will therefore come to rest in its up position.

Of course at this time relay R1 will be deenergized and hence relay R2 will also be deenergized. However, relay R2 will not be deenergized immediately upon the opening of pole P1 and contact CT1 of the relay R1 because of the presence of the capacitor C2 which is shunted across the winding of relay R2. The capacitor C2, which was charged during the time that the relay R1 was energized now discharges through the winding of the relay R2 and maintains it energized for a finite time interval after relay R1 has dropped out. The fact that the relay R2 does not drop out immediately results in the continued flow of current from the thyratrons V1 and V2 to the auxiliary motor 66 and thus allows for dynamic braking of the auxiliary motor 66 in a manner to be described.

The conditions illustrated in Figure 10 will be restored as soon as the treadle 41 is depressed by the operator to initiate a subsequent sewing operation, because depression of the treadle 41 opens the treadle switch 102 and hence breaks the holding current circuit for the relay R3, thereby allowing the poles P5 and P6 of relay R3 to drop-out and re-establish the circuit conditions as shown.

Consider first the conditions existing when the relay R1 is still in its energized state, and when therefore pole P1 and pole P2 of this relay are respectively engaging the contacts CT1 and CT2. In this condition, the relay R2 is energized and direct current flows from the thyratron rectifier circuit along the conductor 127 through the armature 66a and thence through conductor 129 and pole P2 and contact CT2 of the relay R1, along conductor 128 and through the field winding 66b to the common return line 126. The resistor H7 is thus short-circuited by the pole P2 and contact CT2 circuit of the relay R1, and the auxiliary motor 66 drives the spindle and hence the synchronizer 72. When now a brush 94 registers with the gap in the split-ring of the synchronizer which is operative, depending upon the state of energization of the relay R3, the current continuity for relay R1 is broken. This relay drops out and pole P1 and pole P2 of the relay transfer to their normally deenergized condition. The relay R2 energizing circuit is thus broken through the now open pole P1 circuit of relay R1 but remains in its energized state due to the action of the capacitor C2, therefore continuing to supply current to the motor 66. However, when relay R1 dropped-out pole P2 transferred into engagement with contact CT3 thereby removing the short-circuit across resistor H7 but now providing a short-circuit across the armature 66a of the motor 66.

This short-circuit can be traced from the bottom of the armature 66a up through conductor 139 through pole P2 and contact CT3 of relay R1, upward and across and down along conductor 129, thence through resistor H7 and the field winding 66b of the motor. With the armature 66a thus short-circuited while the field 66b remains energized, the motor 66 tends to act as a generator and a rotational force is exerted on the armature 66a in a direction counter to its normally running direction. This causes the armature 66a to be braked very rapidly and it therefore comes to a halt almost immediately, thus preventing coasting with attendant over-travel of the needle 145. The relay R2 now drops out because the current supplied from the capacitor C2 drops below the minimum required value to maintain hold-in, and the current flow to the motor from the thyratrons V1 and V2 is terminated because of the restored grid biasing conditions previously explained.

The action just described takes place regardless of the state of energization of the relay R3, this latter relay merely determining which of the split-rings 84 or 85 is to control the needle position. The function of the resistor H7, which is only in the circuit during the interval of dynamic braking of the auxiliary motor 66, limits the current flow in the short-circuited armature winding 66a to a value which is non-destructive insofar as the armature winding itself is concerned and also with regard to the current carrying capacity of the pole P2 and the contact CT3 of relay R1, but does not reduce the short-circuit current to a value which would interfere with the dynamic braking.

It will be observed that resistance-capacitance networks are shunted across the several poles and terminals of the relay R1. These networks serve the function of arc-suppression for purposes of insuring long contact life. The resistors H3 in the grid circuit of the thyratrons V1 and V2 are required to limit the current flowing from the winding L3 during the time that the relay R2 is energized. Without these resistors H3, the winding L3 would be short-circuited and the consequent excessive current flow could be destructive. The resistance-capacitance networks H2 and C1 in the grid circuits of the thyratrons V1 and V2 are to prevent direct connection of the grids to the cathodes also during the time that the relay R2 is energized since the recommended operating conditions for these valves indicates that the latter condition is undesirable. A set of typical components and component values for the elements illustrated in the circuit of Figure 10 would be as follows:

| | |
|---|---|
| $R_1$ | C. P. Clare type HG-2A 1000 or equivalent. |
| $R_2$, $R_3$ | C. P. Clare type EK-1074 or equivalent. |
| $R_4$ | Amperite type 115 NO 20 or equivalent. |
| $H_2$ | 100,000 ohms. |
| $H_3$ | 3,300 ohms. |
| $H_4$ | 2 ohms. |
| $H_5$ | 1 ohm. |
| $H_6$ | 8 ohms. |
| $H_7$ | 50 ohms, 100 watts. |
| $C_1$ | .1 microfarad. |
| $C_2$ | 20 microfarads. |
| $C_3$ | 10 microfarads. |
| $C_4$ | 4 microfarads. |
| $C_5$ | 1 microfarad. |
| $C_6$ | .01 microfarad. |
| CL1, CL2 | 1N91 diode. |
| $V_1$, $V_2$ | RCA type 5557 thyratron. |
| $T_1$ | Primary 230 volts A.C.<br>Secondary $L_2$, 460 volts @ 1 ampere center-tapped.<br>Secondary $L_3$, 48 volts @ 200 milliamperes, center-tapped.<br>Secondary $L_4$, 5 volts @ 5 amperes, center-tapped. |
| Motor 66 | 1/20 H.P., 220 volts D.C., series wound, 10,000 r.p.m., Robbins & Myers or equivalent. |

With the components above listed utilized in the circuit of Figure 10, needle stopping times on the order of 10 to 15 milliseconds have been achieved. The needle stopping time may be defined as that time interval between the time that a synchronizer brush loses contact with its split-ring due to synchronizer rotation and the time thereafter at which the needle comes to rest. Needle stopping times of this order are required in the garment manufacturing business wherein as many as 40 stops per minute may be made by the operator. This corresponds to an average time 1½ seconds for each stitching operation, which includes the stitching time plus the time to stop the needle and turn the work for the initiation of a new stitching operation. It is therefore clear that the needle stopping time must be an insignificant fraction of the 1½ seconds required per stitching operation.

In order to achieve the very rapid needle stopping time of 10 to 15 milliseconds previously mentioned certain considerations are involved. Firstly, the relay R1 must be capable of extremely fast transfer of its poles from one set of contacts to another, and the Clare type HG-2A 1000 is satisfactory since it is capable of microsecond switching. Secondly, the relays R2 and R3 must have no more than a predetermined maximum drop-out time, and the Clare EK-1074 type is characterized by a 10 millisecond maximum pull-in and drop-out time. The capacitor C2, of course, provides the ability to controllably extend the drop-out time of the relay R2, as is here done.

The rapid needle-stopping time is achieved in the following way. The ten thousand (10,000) r.p.m. auxiliary motor 66 is geared down to approximately four hundred (400) r.p.m. through the worm gear transmission to the teeth 49 on the brake element 45, and thence through the belt 68 and pulley 70 to the spindle. This corresponds of course to seven revolutions per second of the spindle and therefore seven complete cycles of needle reciprocation per second since one revolution of the spindle corresponds to one reciprocation cycle of the needle 145. One reciprocation cycle of the needle 145 therefore occupies one-seventh of a second. Observation of the split-rings 84 and 85 of the synchronizer 72, as illustrated in the showing of Figure 10, reveals that the split subtends an angle of approximately 60 degrees, which corresponds therefore to one sixth of a revolution of the spindle, or one-sixth of a needle reciprocation cycle. Since an entire reciprocation cycle takes only one-seventh of a second and the gap in the split-ring represents one-sixth of a revolution, the total elapsed time during which a brush 94 is in the gap region corresponds to one-forty second of a second or approximately 25 milliseconds.

It is clear that the synchronizer must be stopped within this 25 millisecond time interval or else the brush 94 will again come into contact with the opposite end of the split-ring, and no stopping will therefore be possible. As before mentioned, the components described in connection with the description of Figure 10 are sufficient to insure stopping within ten to fifteen milliseconds so that overriding of the brush onto the approaching end of the split-ring is prevented. Assuming that the split-ring 84 as shown in Figure 10 causes the needle 145 to stop in its down position, it is preferable that the synchronizer be so set-up that the brush 94 encounters the gap in the split-ring 84 somewhat in advance of the downmost position of the needle, so that during the needle-stopping time the needle will first continue downward before starting to rise. This insures that the needle will not rise to a position above the cloth plate before it stops. Typically, power sewing machines are so arranged that the needle at its bottommost point of travel is approximately 3/8 of an inch below the cloth plate, and with the synchronizer set-up as previously described the needle will always stop within 1/8 of an inch of its bottommost travel point.

Similar considerations of course apply to the positioning of the gap in the split-ring 85 for stopping the needle at its topmost position. In fact, it is clear that positions other than top and bottom needle-stopping are possible by proper orientation of the gaps in the split-rings relative to the position of the needle. Moreover, additional stopping positions can be readily provided for by adding additional split-rings to the synchronizer 72 and utilizing a somewhat different relay configuration in place of the relay R3, the remainder of the circuitry of Figure 10 of course would remain the same.

Consider now the various modes of operation which may be employed with the sewing machine illustrated in Figure 1 by proper use of the circuitry of Figure 10. These modes are as follows:

(1) Normal stitching with termination of needle motion in down position.
(2) Normal stitching with termination of the needle motion in the up position.
(3) Single stitch operation.

The first mode of operation has already been described in connection with the explanation of the circuit of Figure 10 but a brief recapitulation will here be presented.

The stopping of the needle in its down position or in its up position is controlled solely by the relay R3, and consequently of course by the knee-lift switch 109, the remainder of the circuitry of Figure 10 operating in the same way for needle-stopping in either the down or the up position. With the relay R3 in the condition as shown in Figure 10, split-ring 84 of the synchronizer 72 will control needle position and since this split-ring causes down position stopping it is evident that the needle is stopped in its down position because the brush 94 is in registration with the gap of the split-ring 84.

With the circuit conditions as shown, all of the relays R1, R2, and R3 are deenergized and thyratrons V1 and V2 are cut off. When now the operator depresses the treadle 41 he thereby opens the treadle switch 102 and prevents the synchronizer 72 from energizing any of the relays. When now the operator releases the treadle 41, the treadle switch 102 closes to the shown position, and assuming that the gap in the split-ring 84 does not register with its associated brush 94, then the action is as follows. Direct current will be conducted from the crystal rectifiers CL1 and CL2 through conductor 105, treadle switch 102, and pole P6 and contact CT8 of relay R3 to the split-ring 84. The current then continues from the split-ring 84 through the bus-bar 85' to the center ring 83, out through its brush 94, through switch 4 of relay R4 to energize relay R1.

When relay R1 picks up, the resistor H7 is short-circuited and the relay R2 is energized, thereby removing the bias from the thyratron grids and allowing direct current to be passed to the armature and field of the auxiliary motor 66. The motor 66 therefore drives the worm gear and revoluble brake member and hence the spindle through the belt 68. The synchronizer 72 therefore rotates with the spindle until the gap in the split-ring 84 is encountered by the brush 94, thereby breaking the current continuity to relay R1 which drops out. When relay R1 drops out it short-circuits the armature 66a and thereby causes the motor 66 to be dynamically braked because current is still being fed to the field 66b from the thyratrons V1 and V2 since the relay R2 has not yet dropped out due to the action of capacitor C2. The motor 66 comes to a halt and the relay R2 drops out thereby cutting off the thyratrons V1 and V2 by restoring the grid bias.

The only difference in operation between the down position mode just described and the up position mode is in the action of the relay R3. If the sewing machine operator desires that the needle be stopped in its up position when he releases the treadle 41, he must strike the knee-pad 116 and thereby close the knee-lift switch 109 at such time that the switch 109 will be closed when the treadle switch 102 is closed. This causes the relay R3 to be energized in the manner previously described, thereby transferring the poles P5 and P6 from their shown condition into engagement with the contacts CT6 and CT7. The split-ring 85 of the synchronizer 72 now controls the needle-stopping position. The action of the remainder of the circuitry of Figure 10 is exactly as previously described and the needle will come to rest in its up position. When the operator now depresses the treadle 41 to initiate the next stitching operation, the opening of the treadle switch 102 deenergizes the relay R3 and the poles P5 and P6 drop out and are restored to the condition illustrated.

The single stitch mode of operation is obviously a combination of the two previously described modes. There is however one exception. In single stitch operation, the needle drive is performed solely by the auxiliary motor 66, the main motor 13 never coming into driving engagement with the clutch assembly. As previously described, it will be recalled that the treadle switch 102 opens when the treadle 41 is depressed sufficiently to disengage the brake but before the clutch to the main motor 13 is engaged. If the conditions are as shown in Figure 10, then single stitch operation may be performed as follows. The knee-lift switch 109 is closed by the operator by striking the knee-pad 116. Since the treadle switch is closed the relay R3 is energized, the split-ring 85 controls the needle-stopping position, and the needle therefore rises to its up position and stops. If the operator now depresses the treadle 41 just sufficiently to open the treadle switch 102 but not to engage the main motor 13, then relay R3 will drop out and split-ring 84 will control the needle position and thereby cause the needle to descend to its down position. It is clear then, that by alternately striking the knee-pad 116 and depressing the treadle 41 just sufficiently to open the treadle switch 102, the sewing machine operator may cause the needle to move through successive half reciprocation cycles and thereby achieve the single stitching operation.

Figure 11:
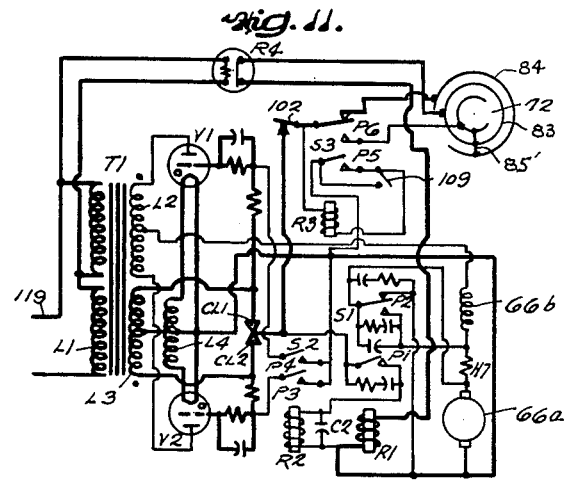

Figures 11 through 16 illustrate circuit conditions which have already been described and briefly correspond to the following. Figure 11 illustrates the circuit conditions which prevail when a sewing operation is terminated and the machine is set-up for down position needle-stopping. The needle is not at its down position as shown by the fact that the split-ring 84 is in contact with its brush. Relay R1 has not yet been picked up and the motor 66 is therefore still at rest.

Figure 12:
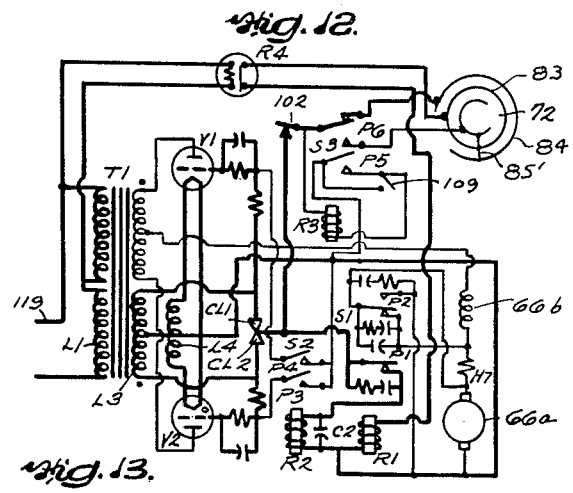

Figure 12 illustrates the same situation as that of Figure 11 but at a short time later when relay R1 has been picked up and its poles P1 and P2 have transferred their contact positions. The motor 66 is still inoperative since the relay R2 has not yet been picked up to remove the grid bias from the thyratrons V1 and V2.

Figure 13:
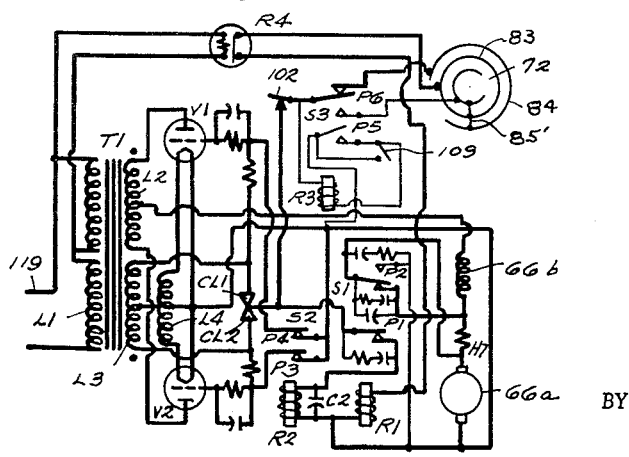

Figure 13 illustrates the conditions an instant later when relay R2 has picked up and the motor 66 just starts to rotate because it is being supplied with current from the thyratrons V1 and V2.

Figure 14:
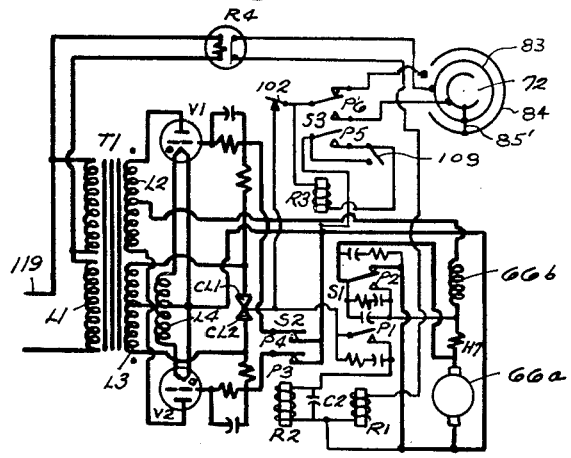

Figure 14 illustrates the conditions at yet an instant later, wherein the needle has descended to its down position and the gap in the split-ring 84 is now in registration with its associated brush. Relay R1 has dropped out but relay R2 has not yet dropped out, so that the motor 66 is in a condition of being dynamically braked.

Figure 15:
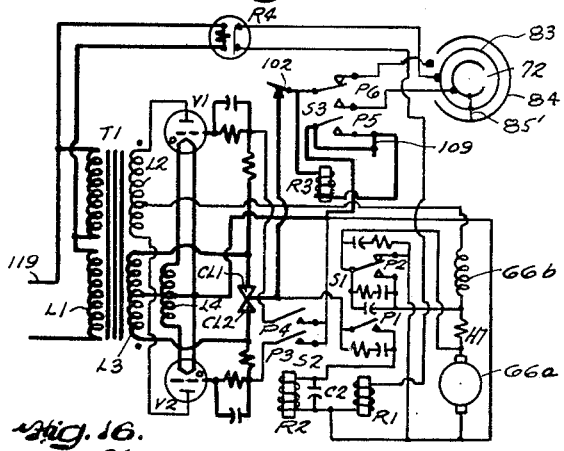

Figure 15 illustrates the conditions after relay R2 has dropped out and the motor 66 has therefore come to a stop. The same figure shows that the knee-lift switch 109 has been closed to cause the needle to rise to its up position, but that the relay R3 has not yet been energized.

Figure 16:
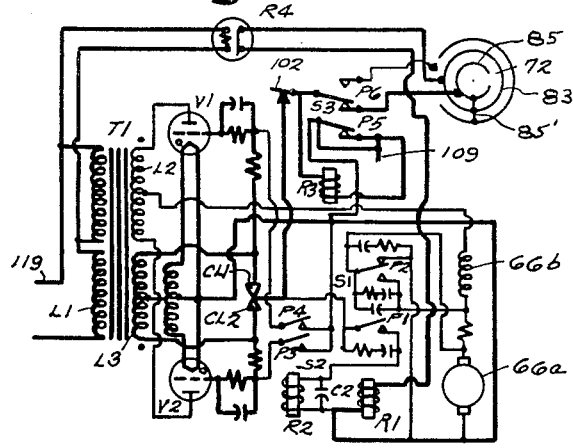

Figure 16 illustrates the condition just after that illustrated in Figure 15 wherein the relay R3 has been energized and its poles have transferred their contacts thereby enabling the split-ring 85 to cause the needle to rise to its up position. Since relays R1 and R2 have not as yet been energized, the motor 66 is at rest and no rotation of the spindle has as yet occurred.

Having now described our invention, it will be apparent to persons normally skilled in the art that various changes and modifications may be made from time to time for differing applications, but that such changes and modification can be made without departing from the general principles or real spirit of our invention, and accordingly it is intended to claim the same broadly as well as specifically, as indicated in the appended claims.

What is claimed as new and useful is:

1. In combination first and second relatively movable members so related that particular positions of said first member always correspond to particular positions of said second member, means associated with said first member for sensing at least one predetermined position thereof, drive means for driving said first member including a direct current motor and motor energizing means including a direct current source for energizing both the field winding and armature winding of the said motor and also including first control means responsive to said sensing means for controlling the transfer of current from said current source to said motor windings, said motor energizing means being automatically activatable by said sensing means to cause said motor to drive said first member to the said sensable predetermined position whenever the sensed position of said first member is different from said predetermined position, said motor being thereafter dynamically braked to a stop substantially instantaneously by short-circuiting the motor armature winding under the control of said sensing means, and second control means for selectively disabling said sensing means and thereby preventing the atomatic activation of said motor energizing means, said current comprising a gated rectifier circuit effective responsive to a first gating signal level from said first control means to pass current to said motor and effective responsive to a second gating signal level from said first control means to cut-off the current to said motor, said first gating signal level being established when the sensed position of said first member is different from said predetermined position and said second gating signal level being established when the sensed position of said first member corresponds to said predetermined position provided that said sensing means is not disabled by said second control means.

2. The combination according to claim 1 wherein the said short-circuiting of the motor armature winding is performed by said first control means at a predetermined time prior to the establishing of said second gating signal level, said short-circuit being maintained throughout the time interval between said predetermined time and time of establishing said second gating signal level.

3. The combination according to claim 2 wherein said first control means comprises third and fourth control means, said fourth control means establishing said second gating signal level in response to a first state of said third control means and establishing said first gating signal level in response to a second state of said third control means, said third control means responsive to said sensing device residing in its first state when the sensed position of said first member corresponds to said predetermined position and transferring to its second state when the sensed position of said first member is different from said predetermined position.

4. The combination according to claim 3 wherein said third control means comprises a first electromechanical relay having at least first and second independent pole and contact circuits and an energizable winding, said third control means being in its said first state when said relay winding is deenergized and being in its second state when said relay winding is energized, said first pole and contact circuit effecting said motor armature-winding short-circuit when said relay winding is deenergized at said predetermined time and removing said short-circuit when said relay winding is energized.

5. The combination according to claim 4 wherein said fourth control means comprises a second electromechanical relay having at least one pole and contact circuit and an energizable winding, said second relay winding being energized by the said second pole and contact circuit of said first relay when said first relay winding is energized, and delay means for maintaining said second relay winding energized during said armature short-circuit time interval even though said first relay winding is deenergized.

6. The combination according to claim 5 wherein said delay means is a capacitor connected across said second relay winding.

7. The combination according to claim 5 wherein said gated rectifier circuit comprises a grid-controlled thyratron and said fourth control means further includes a bias signal source for establishing said second gating signal level between the grid and cathode of said thyratron and thereby maintaining said thyratron in cut-off condition, the said pole and contact circuit of said second relay being effective responsive to energization of said second relay winding to suppress said bias signals between said grid and cathode of said thyratron and thereby establish said first gating signal level, whereby said thyratron is rendered conductive and rectified current is passed to the windings of said motor, said thyratron being rendered non-conductive by the reestablishment of said second gating signal level when thereafter at the end of the armature short-circuit time interval said second relay winding is deenergized.

References Cited in the file of this patent

UNITED STATES PATENTS

| Re. 15,125 | Lindquist et al. | June 14, 1921 |
| 2,364,603 | Coxon et al. | Dec. 12, 1944 |
| 2,708,415 | White | May 17, 1955 |
| 2,853,967 | Schwab | Sept. 30, 1958 |

FOREIGN PATENTS

| 155,428 | Australia | Feb. 25, 1954 |
| 910,023 | Germany | Apr. 26, 1954 |

UNITED STATES PATENT OFFICE
CERTIFICATE OF CORRECTION

Patent No. 2,961,591 November 22, 1960

Samuel R. Frankel et al.

It is hereby certified that error appears in the above numbered patent requiring correction and that the said Letters Patent should read as corrected below.

Column 2, line 65, for "show" read -- shown --; column 15, line 46, for "atomatic" read -- automatic --; line 47, after "current" insert -- source --.

Signed and sealed this 10th day of October 1961.

(SEAL)
Attest:

ERNEST W. SWIDER
Attesting Officer

DAVID L. LADD
Commissioner of Patents